(12) United States Patent
Sugiura et al.

(10) Patent No.: US 7,914,189 B2
(45) Date of Patent: Mar. 29, 2011

(54) EXTERIOR COMPONENT FOR VEHICLE

(75) Inventors: Izuru Sugiura, Kariya (JP); Takashi Sugie, Tokai (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 143 days.

(21) Appl. No.: 12/292,517

(22) Filed: Nov. 20, 2008

(65) Prior Publication Data

US 2009/0129106 A1 May 21, 2009

(30) Foreign Application Priority Data

Nov. 21, 2007  (JP) .................................. 2007-301730
Mar. 21, 2008  (JP) .................................. 2008-073919
Mar. 21, 2008  (JP) .................................. 2008-073921

(51) Int. Cl.
*B60Q 1/26* (2006.01)
*F21V 9/16* (2006.01)

(52) U.S. Cl. ............................ 362/501; 362/84; 362/493

(58) Field of Classification Search .................... 362/84, 362/493, 501, 540, 495, 503; 40/544
See application file for complete search history.

(56) References Cited

U.S. PATENT DOCUMENTS

| 4,494,326 | A | * | 1/1985 | Kanamori | 40/593 |
| 4,603,065 | A | * | 7/1986 | Mori et al. | 428/31 |
| 7,198,299 | B2 | | 4/2007 | Kajiwara et al. | |
| 7,387,397 | B2 | * | 6/2008 | Konet et al. | 362/84 |
| 7,731,394 | B2 | * | 6/2010 | Suzuki et al. | 362/330 |
| 2006/0114685 | A1 | * | 6/2006 | Seeber | 362/495 |
| 2007/0062084 | A1 | * | 3/2007 | Rosa | 40/544 |

FOREIGN PATENT DOCUMENTS

| JP | 2004-338522 | 12/2004 |
| JP | 2004-247182 | 9/2005 |
| JP | 2005-247182 | 9/2005 |

* cited by examiner

*Primary Examiner* — Stephen F Husar
*Assistant Examiner* — Peggy A. Neils
(74) *Attorney, Agent, or Firm* — Finnegan, Henderson, Farabow, Garrett & Dunner, LLP (57) ABSTRACT

An exterior component for a vehicle includes a first member having a decorative surface provided at an external portion thereof for transmitting light, the first member further including a first engaging portion, a second member having a second engaging portion engaging with the first engaging portion of the first member, the second member attached to the vehicle, the first member and the second member forming a double layered structure under the first engaging portion of the first member engaging with the second engaging portion of the second member, and a light-emitting member provided in the double layered structure of the first member and the second member for lighting up and shutting off the light in response to a supply of electricity supplied from the vehicle.

6 Claims, 9 Drawing Sheets

EXTERIOR COMPONENT FOR VEHICLE

CROSS REFERENCE TO RELATED APPLICATIONS

This application is based on and claims priority under 35 U.S.C. §119 to Japanese Patent Application 2007-301730, filed on Nov. 21, 2007, Japanese Patent Application 2008-073919, filed on Mar. 21, 2008, and Japanese Patent Application 2008-073921, filed on Mar. 21, 2008, the entire content of which is incorporated herein by reference.

FIELD OF THE INVENTION

The present invention relates to an exterior component for a vehicle. More particularly, the present invention pertains to an exterior component for a vehicle having a light-emitting member.

BACKGROUND

Known exterior components for vehicles (molding, or the like) have a function to enhance a value of a vehicle by improving an appearance design of a vehicle. Other known exterior components are configured to cover a glass rim portion and to hold a glass. Among known exterior components, directional indicators, headlights, rear lights, and fog lamps are applied in order to display and notify a position, a turning direction, and an emergency of a vehicle, or the like, to persons and other vehicles around the vehicle. Those exterior components are operated manually by an occupant inside a vehicle, or are operated remotely by means of a remote control key, or the like.

A known exterior component for a vehicle, which includes a double layered structure, is disclosed in JP2004-338522A. The conventional exterior component includes a sash mold member including a groove portion for accommodating a glass run channel and a retainer portion provided at a rear surface side of the groove portion, or the like. The sash mold member is formed to have a constant transverse cross section. The exterior component further includes a garnish made by a synthetic resin molding, or the like, attached to a flange portion of the sash mold member for covering the flange portion of the sash mold member for exhibiting a decorative surface. Specifically, the garnish is superposed over a front surface side of the sash mold member.

A known pillar garnish for a vehicle (exterior component), which includes an upper pillar garnish and a lower pillar garnish, is disclosed in JP2005-247182A. The upper pillar garnish includes a stepped portion. A rear surface of the lower pillar garnish is superposed over the front surface of the stepped portion of the upper pillar garnish. Accordingly, sink marks, which are made on the front surface of the stepped portion, are hidden by the lower pillar garnish. Therefore, degradation of an appearance caused by the generation of the sink marks can be inhibited.

Among the known exterior components mounted on the exterior of the vehicle, the directional indicators are primary means for exhibiting the information by emitting light. As described above, only a limited amount of the information of the vehicle such as a turning direction and an emergency of a vehicle by using conventional exterior components can be notified to persons and other vehicles around the vehicle.

In case of providing a light-emitting member as a new exterior component at a position which can be easily seen by persons around a vehicle, a design of a vehicle needs to be changed, and configurations of an exterior component are required to be changed. In those circumstances, there are drawbacks that manufacturing costs increase and an appearance and design of the vehicle are degraded. Further, when an exterior component is newly provided, there is a drawback that the exterior component may make contact with persons and that a protecting member is required for inhibiting degradation of the light-emitting member caused by wind and rain, which increases the exterior component in size.

In the known door sash for the vehicle, the flange portion side of the door sash (garnish), which is made to be a decorative surface, is made by a synthetic resin molding, or the like. In those circumstances, there may be a drawback that sink marks are made at the garnish, on an opposite side of an engaging portion of the sash mold member, a rib, and attaching portions to the vehicle body, which can be seen from an outside of the vehicle.

Further, in the conventional pillar garnish for the vehicle, there is an adverse effect that a clearance is made between upper and lower divided portions and solid appearance of the pillar garnish is degraded. Because matching of colors and matching of shapes are required for an appearance of the upper pillar garnish and the lower pillar garnish, dimensional precision controls and adjustments between components are required for each product. Further, because a position of the rib is restrained in the superposed portion of the upper pillar garnish and the lower pillar garnish, design of the vehicle is restrained by the position of the rib.

A need thus exists for an exterior component for a vehicle which is not susceptible to the drawback mentioned above.

SUMMARY OF THE INVENTION

According to an aspect of the present invention, an exterior component for a vehicle includes a first member having a decorative surface provided at an external portion thereof for transmitting light, the first member further including a first engaging portion, a second member having a second engaging portion engaging with the first engaging portion of the first member, the second member attached to the vehicle, the first member and the second member forming a double layered structure under the first engaging portion of the first member engaging with the second engaging portion of the second member, and a light-emitting member provided in the double layered structure of the first member and the second member for lighting up and shutting off the light in response to a supply of electricity supplied from the vehicle.

BRIEF DESCRIPTION OF THE DRAWINGS

The foregoing and additional features and characteristics of the present invention will become more apparent from the following detailed description considered with the reference to the accompanying drawings, wherein.

DETAILED DESCRIPTION

Figure 1:
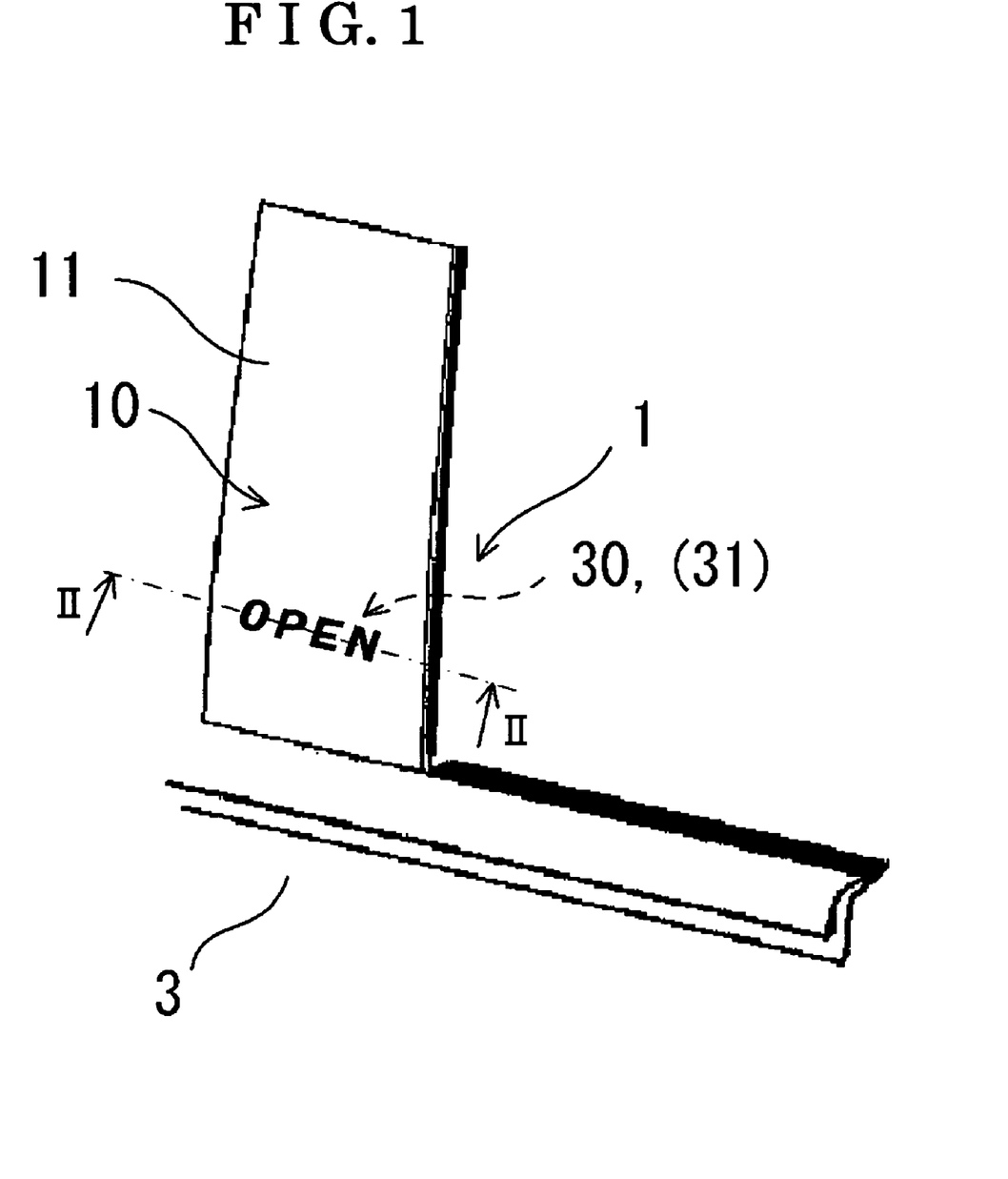
FIG. 1 is a perspective view illustrating an appearance of a pillar garnish (exterior component) for a vehicle according to a first embodiment of the present invention.

A first embodiment of the present invention will be explained in detail with reference to drawing figures. FIG. 1 is a perspective view illustrating an appearance of a pillar garnish 1 (exterior component) for a vehicle according to the first embodiment of the present invention. The pillar garnish 1 includes a decorative surface 11 at an external portion of the pillar garnish 1. A light-emitting body 30 (light-emitting member) (FIG. 2) provided in the pillar garnish 1 lights up and shuts off the light to display information (message) on the decorative surface 11 in cooperation with a function of a door 3.

Figure 2:
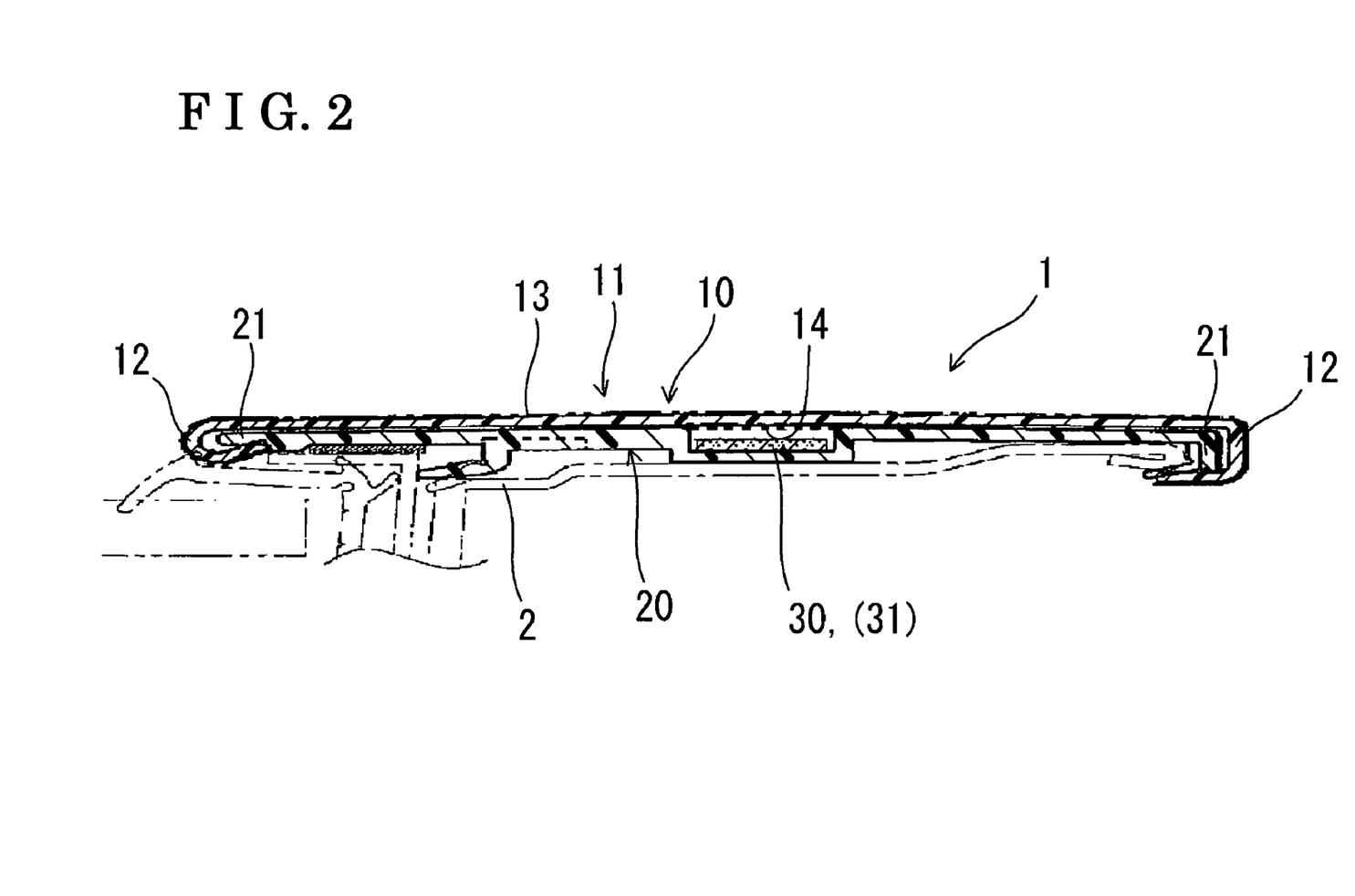
FIG. 2 is a cross-sectional view taken on line II-II of FIG. 1 illustrating the pillar garnish according to the first embodiment of the present invention.

FIG. 2 is a cross-sectional view taken on line II-II of FIG. 1 illustrating the pillar garnish 1 according to the first embodiment of the present invention. The pillar garnish 1 includes a garnish cover 10 (first member), a garnish body 20 (second member) attached to a door sash 2 (vehicle) and the light-emitting body 30 provided between the garnish cover 10 and the garnish body 20. The garnish cover 10 and the garnish body 20 form a double layered structure of the pillar garnish 1. The light-emitting body 30 lights up and shuts off the light in response to a supply of electricity supplied by a wire harness (not illustrated) from the door sash 2 (vehicle).

The garnish cover 10 is made with a plate of a uniform thickness of a material for transmitting light, such as acrylic, polyethylene terephthalate (PET), or the like. A translucent film 13 of metallic appearance is attached on a front surface of the garnish cover 10. A transmittance of the translucent film 13 is approximately 20%. A letters "OPEN", which is information (message) display letters 14 (information display letter), is printed on a rear surface of the garnish cover 10. Further, flange portions 12 (first engaging portion) are provided at both ends of the garnish cover 10.

The garnish body 20 forms a structural portion of the pillar garnish 1. The garnish body 20 includes fitting portions 21 (second engaging portion), which engage with the flange portions 12. The garnish body 20 is made by a resin forming method. A resin material for forming the garnish body 20 can be selected from a resin containing glass fiber and a high-strength resin containing carbon fiber. The resin material for forming the garnish body 20 can also be selected from an inexpensive resin, for example, a recycled material, of which a surface quality is inferior, or the like.

The light-emitting body 30 includes a light source such as a light-emitting diode (LED), a lamp, or the like. The light-emitting body 30 is provided at the garnish body 20. The wire harness (not illustrated) from the door sash 2 (vehicle) is connected to the light-emitting body 30. An organic electroluminescence 31 (organic EL) can be utilized as the light-emitting body 30 other than the LED, or the like.

According to the first embodiment of the present invention, the pillar garnish 1 having the double layered structure of the garnish cover 10 and the garnish body 20 and the light-emitting body 30 provided between the garnish cover 10 and the garnish body 20 can replace an existing pillar garnish. Accordingly, because it is not necessary that the light-emitting body 30 is newly (separately) provided at a position which can be easily seen by a person around the vehicle, review of the structure of the door sash 2 and large shape change of the pillar garnish 1 are not required. Therefore, increase of cost can be restrained and a design of an appearance of the door sash 2 (vehicle) can be retained. Further, there are no adverse effects that the light-emitting body 30 makes contact with persons and that a protecting member is required for inhibiting degradation of the light-emitting body 30 caused by wind and rain, which increases the pillar garnish 1 in size.

Further, the garnish cover 10 includes the translucent film 13 of metallic appearance provided on the front surface of the garnish cover 10. The transmittance of the translucent film 13 is approximately 20%. Accordingly, the light-emitting body 30 is not visible in the appearance of the door sash 2 when the light-emitting body 30 is not emitting light. The light-emitting body 30 is visible as a display portion when the light-emitting body 30 is emitting light. Therefore, a design of an appearance of the door sash 2 can be retained.

Further, when the organic EL 31 is utilized as the light-emitting body, an image, information (message) according to functions, and a color image can be displayed. Therefore, visual effect to an occupant, or the like, can be enhanced.

Figure 3:
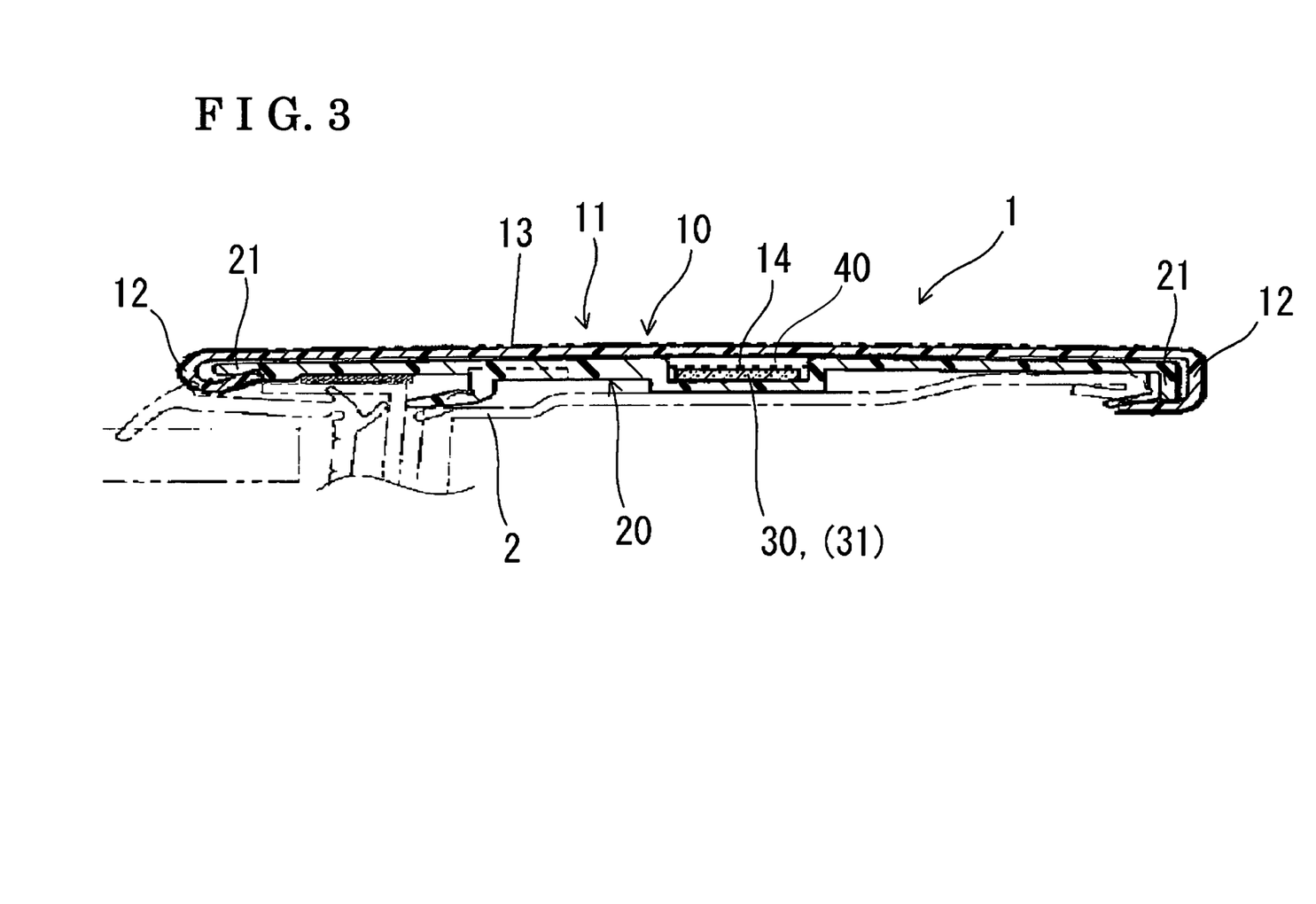
FIG. 3 is a cross-sectional view illustrating a pillar garnish for a vehicle according to a second embodiment of the present invention, the pillar garnish being modified from the pillar garnish for the vehicle according to the first embodiment.

A second embodiment of the present invention will be explained in detail with reference to a drawing figure. FIG. 3 is a cross-sectional view illustrating a pillar garnish 1 for a vehicle according to the second embodiment of the present invention. In the pillar garnish 1 according to the second embodiment, some parts of the pillar garnish 1 for the vehicle according to the first embodiment are changed. Parts and shapes, which are common with those of the first embodiment, will be explained with use of common reference numerals. Difference of the second embodiment with the first embodiment will be mainly explained.

The difference with the first embodiment is that a resin plate 40 for transmitting light is provided at a position between the garnish cover 10 and the light-emitting body 30. The resin plate 40 makes contact with the light-emitting body 30. The information (message) display letter 14 is provided on the resin plate 40.

Because the resin plate 40, on which the information (message) display letter 14 is provided, is provided at the position between the garnish cover 10 and the light-emitting body 30, and the resin plate 40 makes contact with the light-emitting body 30, light emitted from the light-emitting body 30 transmits through the printed information (message) display letter 14 and the information (message) display letter 14 is projected on the rear surface of the garnish cover 10. At this time, both of the resin plate 40, on which the information (message) display letter 14 is provided, and the garnish cover 10 are lit. When the garnish cover 10, on which the translucent film 13 of metallic appearance is attached, is seen from an angled direction, the information (message) display letter 14 on the resin plate 40 can be seen through the garnish cover 10. Accordingly, the information (message) display letter 14 is seen as a letter with a shadow. Therefore, a stereoscopic display effect, in which the information (message) display letter 14 is seen as the information (message) display letter 14 is raised from an outside of the vehicle (door sash 2), can be obtained.

Figure 4:
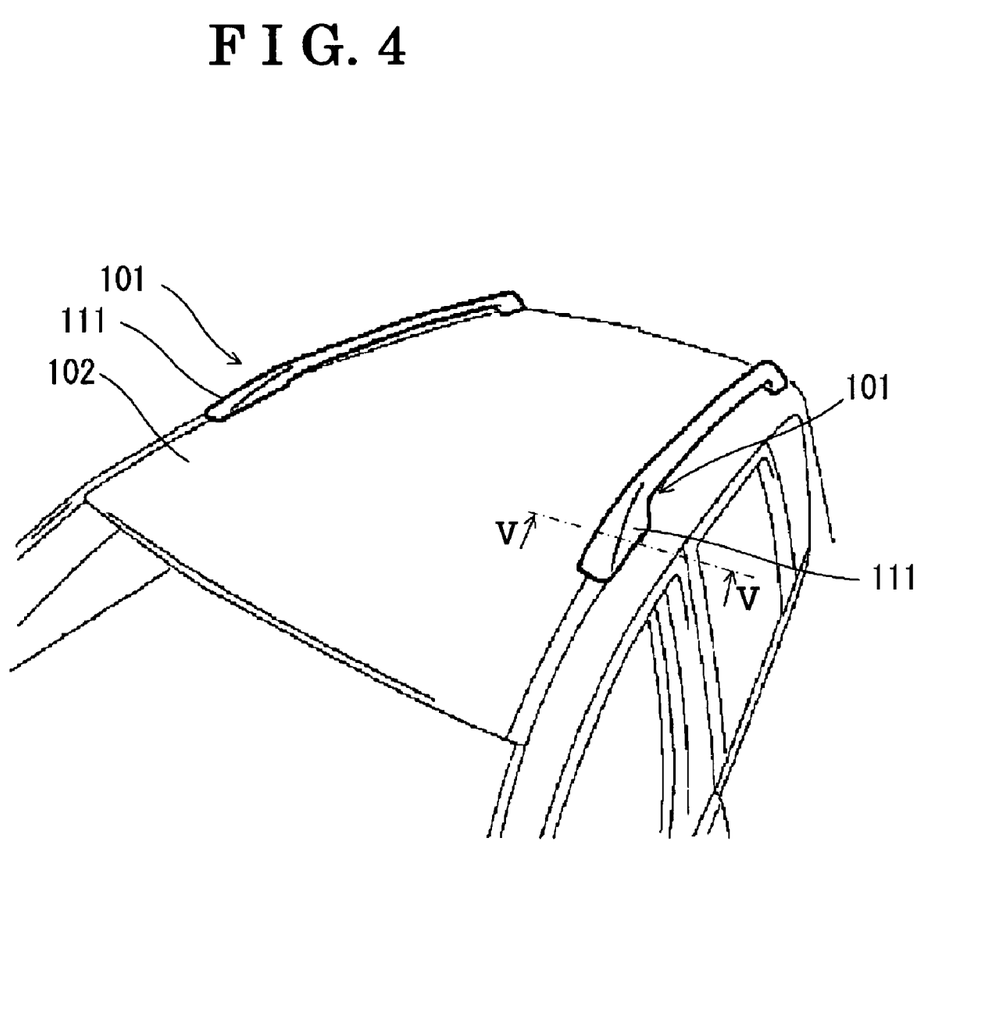
FIG. 4 is a perspective view illustrating an appearance of a roof rail attached to a vehicle according to a third embodiment of the present invention.
Figure 5:
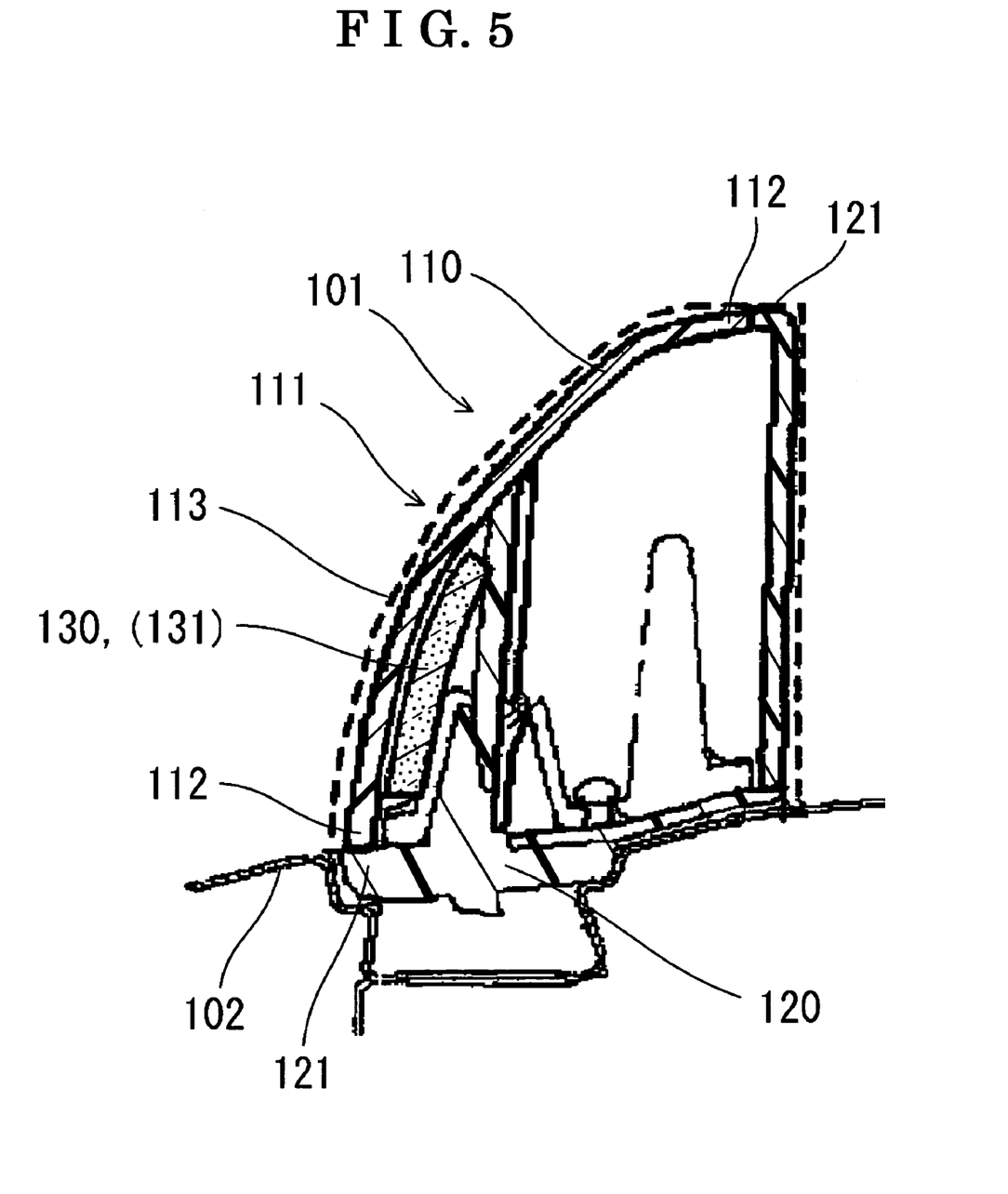
FIG. 5 is a cross-sectional view taken on line V-V of FIG. 4 illustrating the roof rail according to the third embodiment of the present invention.

A third embodiment of the present invention will be explained in detail with reference to drawing figures. FIGS. 4 and 5 are figures illustrating a roof rail 101 (exterior component) for a vehicle according to the third embodiment of the present invention. FIG. 4 is a perspective view illustrating an appearance of the roof rail 101 attached to the vehicle 102. The roof rail 101 includes a decorative surface 111 formed at an external portion of the roof rail 101. A light-emitting body 130 (light-emitting member) (FIG. 5) is provided in the roof rail 101. The light-emitting body 130 lights up and shuts off the light to display information (message) on the decorative surface 111.

FIG. 5 is a cross-sectional view taken from V-V of FIG. 4 illustrating the roof rail 101 according to the third embodiment of the present invention. The roof rail 101 includes a roof rail cover 110 (first member), a roof rail body 120 (second member) attached to the vehicle 102 and the light-emitting body 130 provided between the roof rail cover 110 and the roof rail body 120. The roof rail cover 110 and the roof rail body 120 form a double layered structure of the roof rail 101. The light-emitting body 130 lights up and shuts off the light according to a supply of electricity supplied by a wire harness (not illustrated) from the vehicle 102.

The roof rail cover 110 is made with a material for transmitting light, such as acrylic, PET, or the like. A translucent film 113 of metallic appearance is attached on a front surface of the roof rail cover 110. A transmittance of the translucent film 113 is approximately 20%. First engaging portions 112 are provided at both ends of the roof rail cover 110.

The roof rail body 120 forms a structural portion of the roof rail 101. The roof rail body 120 includes second engaging portions 121, which engage with the first engaging portions 112 of the roof rail cover 110. The roof rail cover 110 and the roof rail body 120 form the double layered structure of the roof rail 101 when the first engaging portions 112 of the roof rail cover 110 engage with the second engaging portions 121 of the roof rail body 120. The roof rail body 120 is made by resin forming method. The resin material for forming the roof rail body 120 can be selected from a resin containing glass fiber and a high-strength resin containing carbon fiber. The resin material for forming the roof rail body 120 can also be selected from an inexpensive resin, for example, a recycled material, of which a surface quality is inferior, or the like.

The light-emitting body 130 includes a light source such as an LED, a lamp, or the like. The light-emitting body 130 is provided at the roof rail body 120. The wire harness (not illustrated) from the vehicle 102 is connected to the light-emitting body 130. An organic EL 131 can be utilized as the light-emitting body 130 other than the LED, or the like.

The roof rail 101 according to the third embodiment has effects similar to the first embodiment and the second embodiment.

Figure 6:
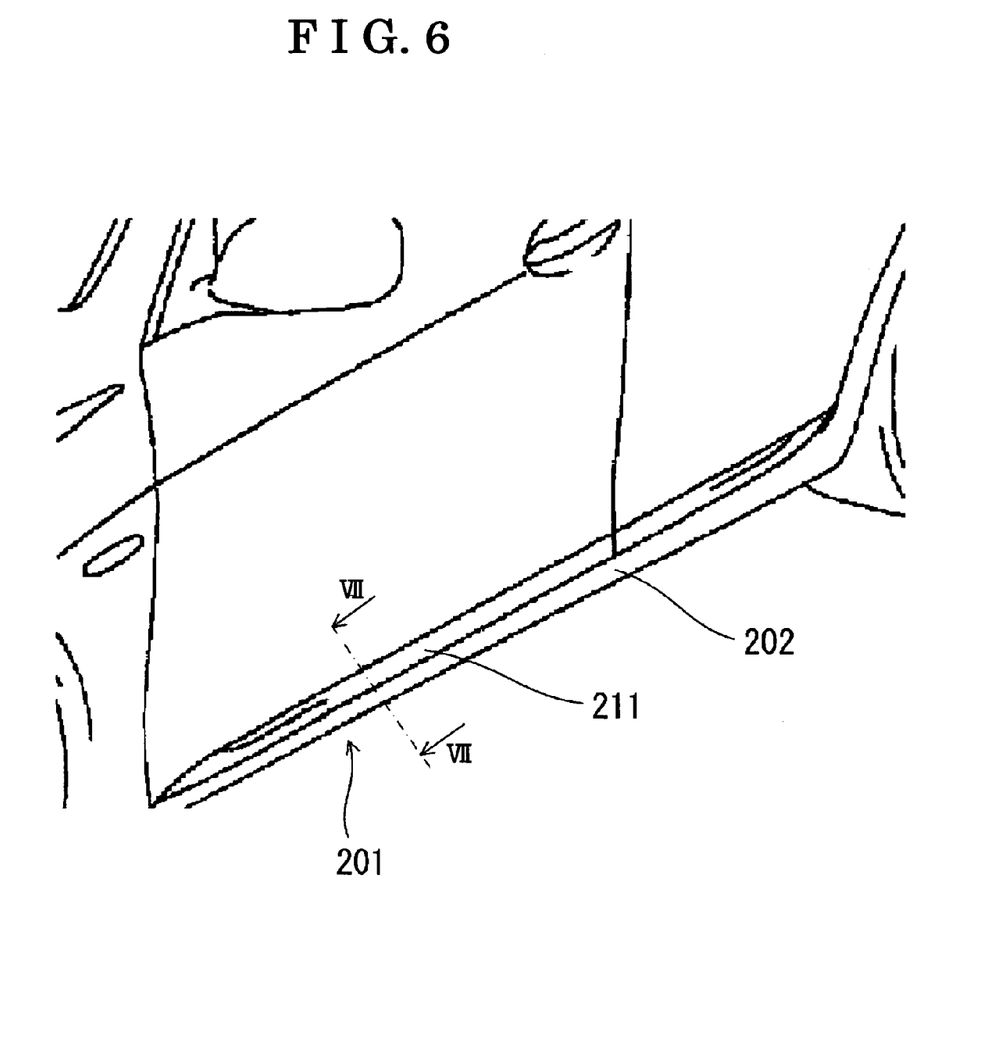
FIG. 6 is a perspective view illustrating an appearance of the side protection molding attached to a vehicle according to a fourth embodiment of the present invention.
Figure 7:
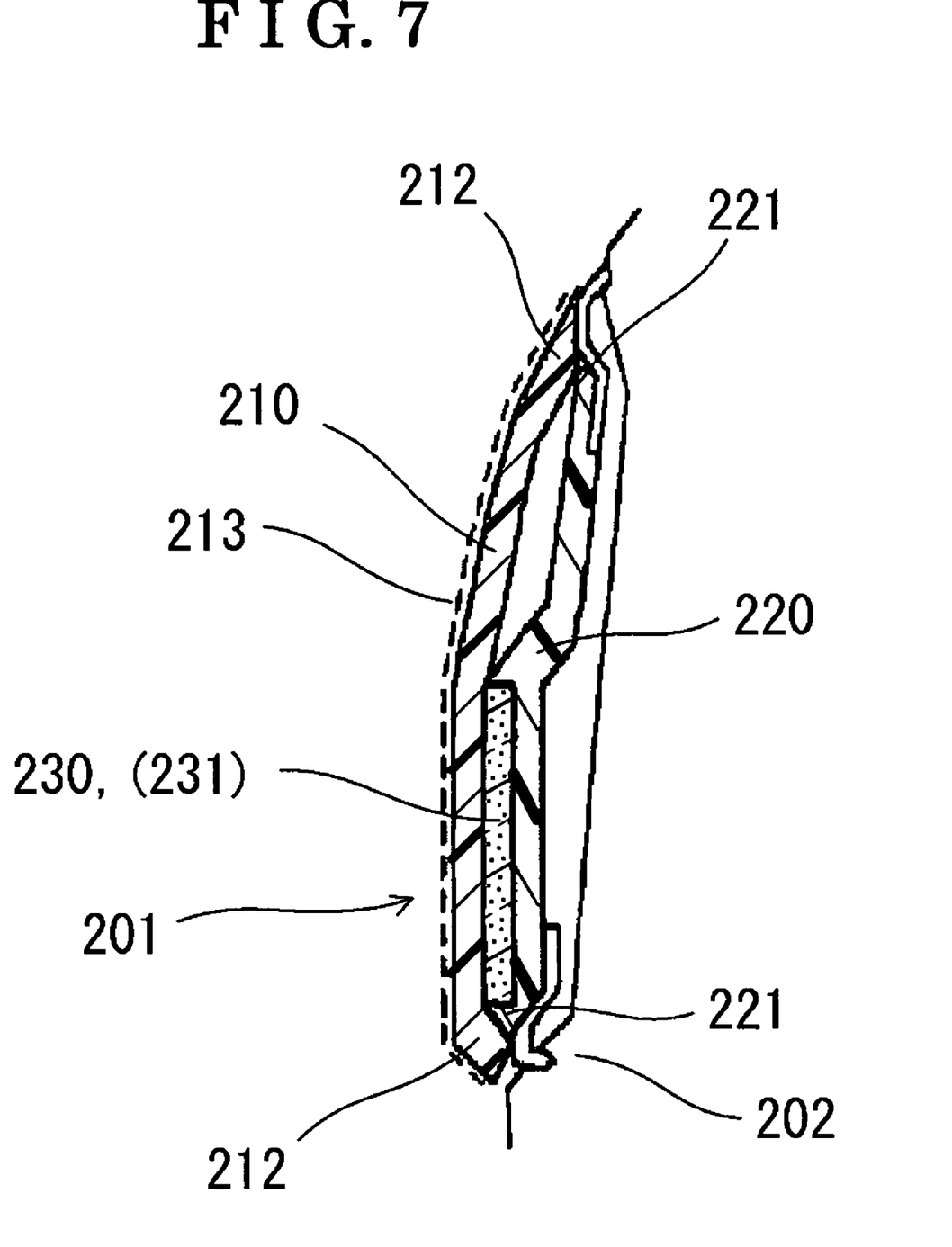
FIG. 7 is a cross-sectional view taken on line VII-VII of FIG. 6 illustrating the side protection molding according to the fourth embodiment of the present invention.

A fourth embodiment of the present invention will be explained in detail with reference to drawing figures. FIGS. 6 and 7 are figures illustrating a side protection molding 201 (exterior component) for a vehicle according to the fourth embodiment of the present invention. FIG. 6 is a perspective view illustrating an appearance of the side protection molding 201 attached to the vehicle 202. The side protection molding 201 includes a decorative surface 211 formed at an external portion of the side protection molding 201. A light-emitting body 230 (light-emitting member) (FIG. 7) is provided in the side protection molding 201. The light-emitting body 230 lights up and shuts off the light to display information (message) on the decorative surface 211.

FIG. 7 is a cross-sectional view taken on line VII-VII of FIG. 6 illustrating the side protection molding 201 according to the fourth embodiment of the present invention. The side protection molding 201 includes a side protection molding cover 210 (first member), a side protection molding body 220 (second member) attached to the vehicle 202 and the light-emitting body 230 provided between the side protection molding cover 210 and the side protection molding body 220. The side protection molding cover 210 and the side protection molding body 220 form a double layered structure of the side protection molding 201. The light-emitting body 230 lights up and shuts off the light according to a supply of electricity supplied by a wire harness (not illustrated) from the vehicle 202.

The side protection molding cover 210 is made with a material for transmitting light, such as acrylic, PET, or the like. A translucent film 213 of metallic appearance is attached on a front surface of the side protection molding cover 210. A transmittance of the translucent film 213 is approximately 20%. First engaging portions 212 are provided at both ends of the side protection molding cover 210.

The side protection molding body 220 forms a structural portion of the side protection molding 201. The side protection molding body 220 includes second engaging portions 221, which engage with the first engaging portions 212 of the side protection molding cover 210. The side protection molding cover 210 and the side protection molding body 220 form the double layered structure of the side protection molding 201 when the first engaging portions 212 of the side protection molding cover 210 engage with the second engaging portions 221 of the side protection molding cover 220. The side protection molding body 220 is made by resin forming method. The resin material for forming the side protection molding body 220 can be selected from a resin containing glass fiber and a high-strength resin containing carbon fiber. The resin material for forming the side protection molding body 220 can also be selected from an inexpensive resin, for example, a recycled material, of which a surface quality is inferior, or the like.

The light-emitting body 230 includes a light source such as an LED, a lamp, or the like. The light-emitting body 230 is provided at the side protection molding body 220. The wire harness (not illustrated) from the vehicle 202 is connected to the light-emitting body 230. An organic EL 231 can be utilized as the light-emitting body 230 other than the LED, or the like.

The side protection molding 201 according to the fourth embodiment has effects similar to the first embodiment and the second embodiment.

Figure 8:
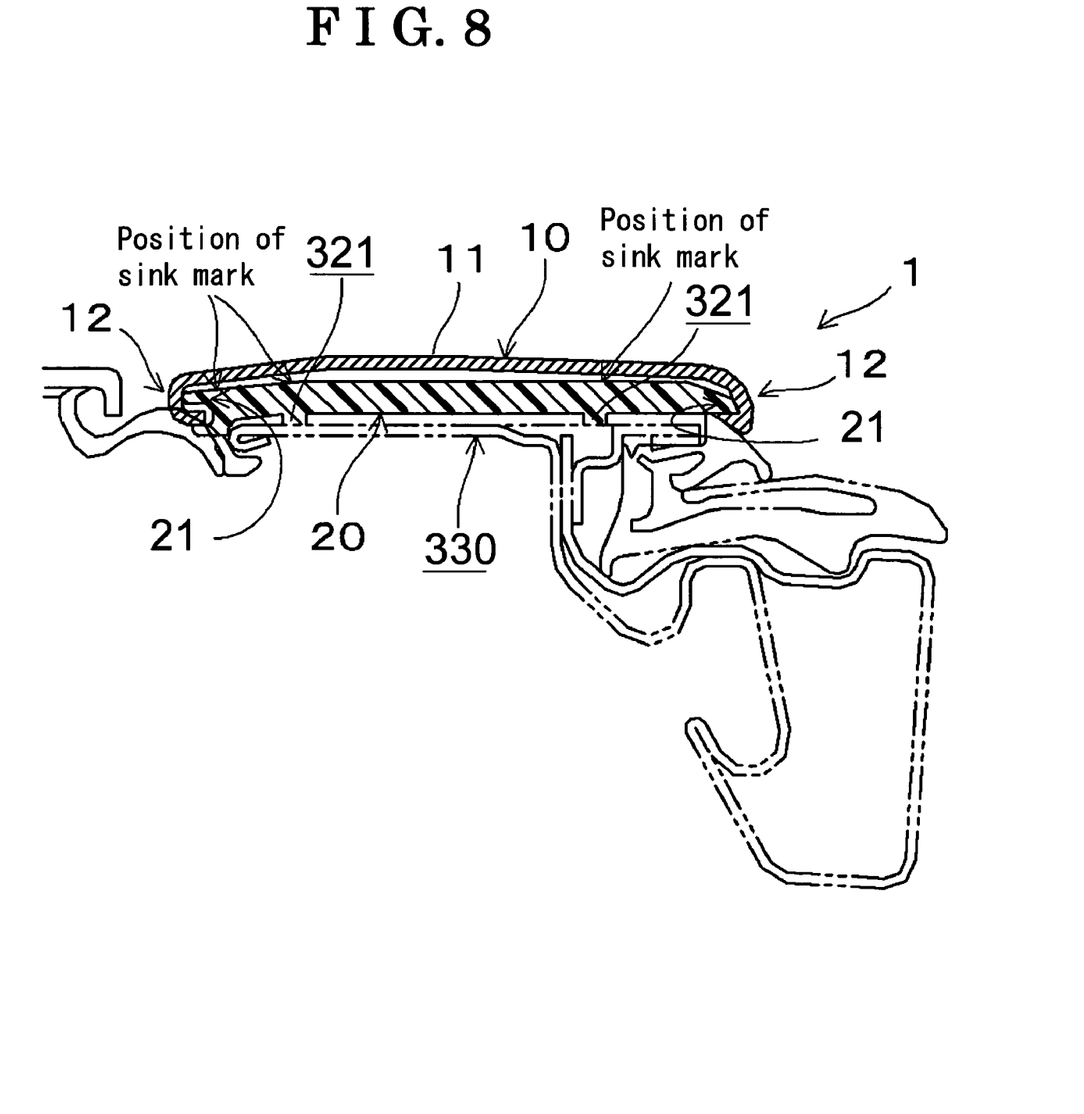
FIG. 8 is a cross-sectional view illustrating a pillar garnish for a vehicle according to a fifth embodiment of the present invention.
Figure 10:
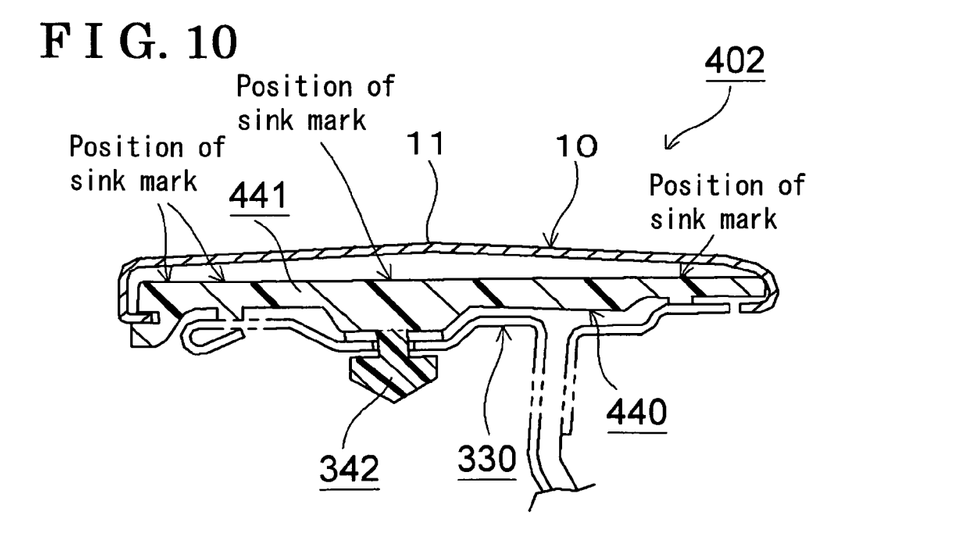
FIG. 10 is a cross-sectional view illustrating a pillar garnish for a vehicle according to a sixth embodiment of the present invention. A garnish body of the pillar garnish includes a hard resin portion and a soft resin portion.

A fifth embodiment of the present invention will be explained in detail with reference to drawing figures. FIG. 8 is a cross-sectional view illustrating a pillar garnish 1 (exterior component) for a vehicle according to the fifth embodiment of the present invention. The pillar garnish 1 includes a garnish cover 10 (first member) and a garnish body 20 (second member). The garnish cover 10 includes a decorative surface 11 formed at an external portion of the garnish cover 10 and flange portions 12 (first engaging portion) formed at both of end portions of the garnish cover 10. The garnish body 20 includes a rib 321 and fitting portions 21 (second engaging portion). The garnish body 20 is attached to a door sash 330 (vehicle) by a clip portion 342 (attaching portion) (FIG. 10). The flange portions 12 of the garnish cover 10 fit (engage) with the fitting portions 21 of the garnish body 20.

The garnish cover 10 is made with a plate of aluminum material, which has a uniform thickness. Both end portions of the plate are bent to form the flange portions 12. Further, the plate is processed by almite after the flange portions 12 are formed. Other than the almite processing, attaching of an exterior film, painting, printing, or the like, can be applied to the plate. Accordingly, various designs of the garnish cover 10 are available.

The garnish body 20 forms a structural portion of the pillar garnish 1. The garnish body 20 includes the rib 321, the fitting portions 21 and the clip portion 342 (FIG. 10), which are extending in a lengthwise direction of the garnish body 20. The garnish body 20 is made by resin forming method as a unit with the rib 321, the fitting portions 21, and the clip portion 342. The resin material for forming the garnish body 20 can be selected from a resin containing glass fiber and a high-strength resin containing carbon fiber. The resin material for forming the garnish body 20 can also be selected from a resin, which is easily degraded by ultraviolet ray, and an inexpensive resin, for example, a recycled material, of which a surface quality is inferior, or the like.

Figure 9:
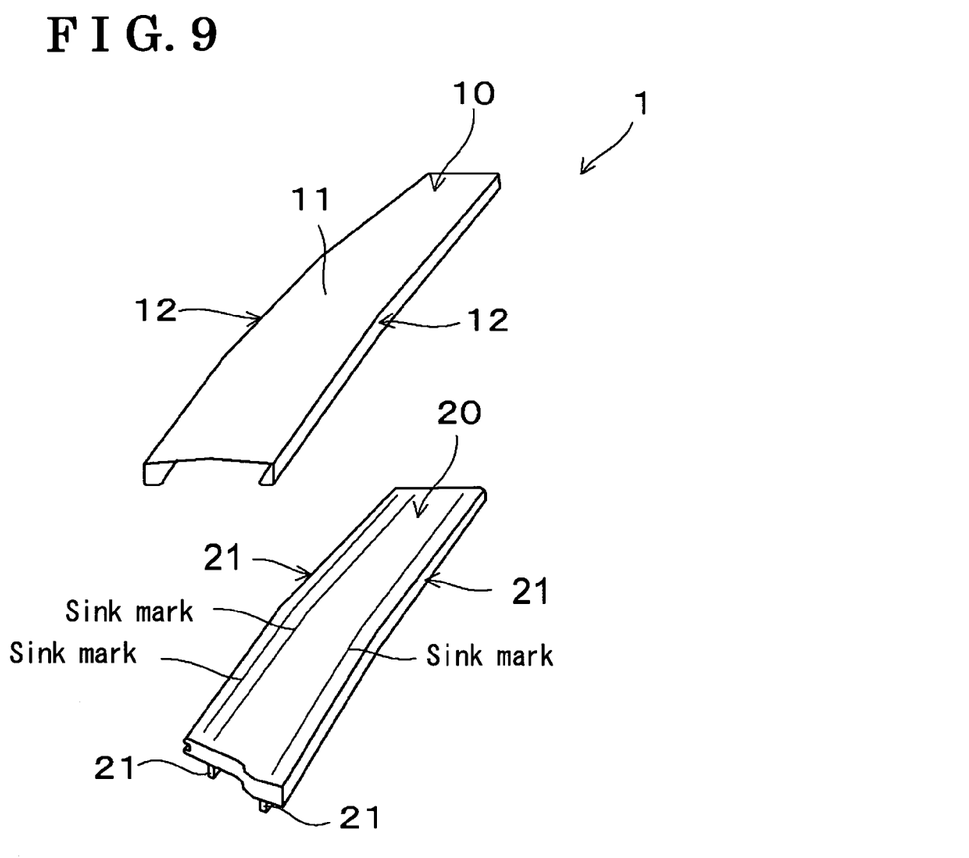
FIG. 9 is an exploded perspective view illustrating the pillar garnish according to the fifth embodiment of the present invention.

FIG. 9 is an exploded perspective view of the pillar garnish 1. The decorative surface 11 of the garnish cover 10 is structured so that the decorative surface 11 covers an entire part of the garnish body 20. Accordingly, a sink mark, which is made when the garnish body 20 is made by resin forming method, and the fitting portions 21 are not seen from an external side of the pillar garnish 1.

According to the fifth embodiment of the present invention, the pillar garnish 1 includes the garnish cover 10, which includes the decorative surface 11 formed at the external portion of the garnish cover 10, and the garnish body 20, which forms the structural portion attached to the door sash 330. Accordingly, even when the rib 321 and the clip portion 342 (FIG. 10) are provided at the garnish body 20 and the sink mark is made at the garnish body 20, the sink mark is covered by the garnish cover 10. Therefore, an appearance of the pillar garnish 1 is not degraded. Further, because the garnish cover 10 is formed as a unit, the pillar garnish 1 can have a solid appearance. Accordingly, dimensional precision controls and adjustments between components for each product, which are required for the known door sash, are not required. Further, because the garnish cover 10, which includes the flange portions 12, has a simple shape, attaching of an exterior film, painting, printing, or the like, can be applied to the garnish cover 10. Accordingly, various designs of the garnish cover 10 are available. Further, because appearance quality of the garnish body 20 is not required, an optimum shape and a material (a resin containing glass fiber, a high-strength resin containing carbon fiber, a resin, which is easily degraded by ultraviolet ray, an inexpensive resin, for example, a recycled material, of which a surface quality is inferior, or the like) can be selected for retaining rigidity of the garnish body 20 to be attached to the garnish cover 10 and to the door sash 330. Further, because a position of the rib 321 at the garnish body 20 is not restrained by the design and the structure of the garnish body 20, degree of freedom of design of the garnish body 20 can be enhanced.

Further, because the garnish cover 10 including the flange portions 12 at both ends has a simple shape, the garnish cover 10 can be made with a plate, which has a uniform thickness. The material of the plate can be selected from various materials, for example, a metal (aluminum, stainless used steel (SUS), iron, titanium, or the like) and a resin (polypropylene (PP), polyethylene (PE), acrylic resin (AC), acrylonitrile-butadiene-styrene (ABS), polycarbonate (PC), or the like).

A sixth embodiment of the present invention will be explained in detail with reference to a drawing figure. FIG. 10 is a cross-sectional view illustrating a pillar garnish 402 (exterior component) for a vehicle according to the sixth embodiment of the present invention. Parts and shapes of the sixth embodiment, which are common with those of the fifth embodiment, will be explained with use of common reference numerals. Differences of the sixth embodiment with the fifth embodiment will be mainly explained.

The pillar garnish 402 includes the garnish cover 10, which forms the decorative surface 11 of the external portion of the garnish cover 10, and a garnish body 440 (second member). A structural portion 441 of the garnish body 440 is made with a hard resin. The clip portion 342 (attaching portion) of the garnish body 440 is made with a soft resin. The clip portion 342 is attached to the door sash 330. The structural portion 441 and the clip portion 342 of the garnish body 440 are made by a double molding as a unit.

クレーム 1の効果According to the embodiments of the present invention, the pillar garnish 1 (roof rail 101, side protection molding 201, pillar garnish 402) for the door sash 2 (vehicle 102, vehicle 202, door sash 330) having the double layered structure of the garnish cover 10 (roof rail cover 110, side protection molding cover 210) and the garnish body 20 (roof rail body 120, side protection molding body 220, garnish body 440) and the light-emitting body 30 (light-emitting body 130, light-emitting body 230) provided between the garnish cover 10 (roof rail cover 110, side protection molding cover 210) and the garnish body 20 (roof rail body 120, side protection molding body 220, garnish body 440) can replace an existing exterior component for a vehicle. Accordingly, because it is not necessary that the light-emitting body 30 (light-emitting body 130, light-emitting body 230) of the pillar garnish 1 (roof rail 101, side protection molding 201, pillar garnish 402) is newly (separately) provided at a position which can be easily seen by a person around the vehicle, review of the structure of the vehicle and large shape change of the exterior component are not required. Therefore, increase of cost can be restrained and a design of an appearance of the vehicle can be retained. Further, because there are no need to newly provide the pillar garnish 1 (roof rail 101, side protection molding 201, pillar garnish 402), there are no adverse effects that the light-emitting body 30 (light-emitting body 130, light-emitting body 230) makes contact with persons, and that a protecting member is required for inhibiting degradation of the light-emitting body 30 (light-emitting body 130, light-emitting body 230) caused by wind and rain, which increases the pillar garnish 1 (roof rail 101, side protection molding 201, pillar garnish 402) in size.

Further, because the garnish cover 10 (roof rail cover 110, side protection molding cover 210) transmits light, lighting up and shutting off the light of the light-emitting body 30 (light-emitting body 130, light-emitting body 230) in cooperation with a vehicle function can be visually seen by an occupant. For example, in cooperation with a smart key system, the pillar garnish 1 (roof rail 101, side protection molding 201, pillar garnish 402) can emit light or display information (message) at an arbitrary set period at the same time when an approach of the occupant is found. As a further example, the pillar garnish 1 (roof rail 101, side protection molding 201, pillar garnish 402) can blink to notify that a fuel cell is being charged.

Further, the pillar garnish 1 (roof rail 101, side protection molding 201, pillar garnish 402) can display and notify necessary information (message) to a person other than an occupant around the vehicle (such as to an oncoming car, a following car, a passenger, or the like) as a required basis. For example, when the pillar garnish 1 (roof rail 101, side protection molding 201, pillar garnish 402) is preliminarily set to cooperate with an in-vehicle navigation system, the pillar garnish 1 (roof rail 101, side protection molding 201, pillar garnish 402) can emit light or display arbitrary information (message) according to situations to notify the surrounding vehicles. As a further example, in cooperation with a burglar alarm system, the pillar garnish 1 (roof rail 101, side protection molding 201, pillar garnish 402) can notify a person around the vehicle that the vehicle has been stolen or broken into. For further example, when the pillar garnish 1 (roof rail 101, side protection molding 201, pillar garnish 402) is set to cooperate with a local transportation control system with use of wireless communication (such as electromagnetic wave communication), the pillar garnish 1 (roof rail 101, side protection molding 201, pillar garnish 402) can notify information (message) from a running vehicle (for example, a velocity, a moving direction, or the like) to surroundings. Accordingly, visual confirmation can be easily made by vehicles, and between a vehicle and passengers. Therefore, the pillar garnish 1 (roof rail 101, side protection molding 201, pillar garnish 402) can promote safety to the passenger and to the surrounding vehicles in order to avoid danger.

According to the embodiments of the present invention, the garnish cover 10 (roof rail cover 110, side protection molding cover 210) includes a translucent film 13 (translucent film 113, translucent film 213).

According to the embodiments of the present invention, the garnish cover 10 (roof rail cover 110, side protection molding cover 210) includes the translucent film 13 (translucent film 113, translucent film 213) provided on the rear surface or the front surface of the garnish cover 10 (roof rail cover 110, side protection molding cover 210). When a level of transmittance of the garnish cover 10 (roof rail cover 110, side protection molding cover 210) is set so that transmission of light through the garnish cover 10 (roof rail cover 110, side protection molding cover 210) is not inhibited (transmittance of approximately 20%), the light-emitting body 30 (light-emitting body 130, light-emitting body 230) is not visible in an appearance of the vehicle when the light-emitting body 30 (light-emitting body 130, light-emitting body 230) is not emitting light. The light-emitting body 30 (light-emitting body 130, light-emitting body 230) is visible as the display portion when the light-emitting body 30 (light-emitting body 130, light-emitting body 230) is emitting light. Accordingly, a design of an appearance of the vehicle can be retained.

According to the embodiments of the present invention, the light-emitting body 30 (light-emitting body 130, light-emitting body 230) includes an organic electroluminescence 31 (organic electroluminescence 131, organic electroluminescence 231).

According to the embodiments of the present invention, because the light-emitting body 30 (light-emitting body 130, light-emitting body 230) includes the organic electroluminescence 31 (organic electroluminescence 131, organic electroluminescence 231), in addition to lighting up and shutting off the light of the light-emitting body 30 (light-emitting body 130, light-emitting body 230), the light-emitting body 30 (light-emitting body 130, light-emitting body 230) can display an image, a message according to functions, and a color image (message).

According to the embodiments of the present invention, a resin plate 40 for transmitting light on which an information display letter 14 is provided is provided at a position between the garnish cover 10 (roof rail cover 110, side protection molding cover 210) and the light-emitting body 30 (light-emitting body 130, light-emitting body 230), and the resin plate 40 makes contact with the light-emitting body 30 (light-emitting body 130, light-emitting body 230).

According to the embodiments of the present invention, light emitted from the light-emitting body 30 (light-emitting body 130, light-emitting body 230) transmits through a printed (or the like) information display letter 14 and the information display letter 14 is projected on the rear surface of the garnish cover 10 (roof rail cover 110, side protection molding cover 210). At this time, both of the resin plate 40 for transmitting light, on which the information display letter 14 is provided, and the garnish cover 10 (roof rail cover 110, side protection molding cover 210) are lit. When the translucent garnish cover 10 (roof rail cover 110, side protection molding cover 210) is seen from an angled direction, the information display letter 14 on the resin plate 40 can be seen through the garnish cover 10 (roof rail cover 110, side protection molding cover 210). Accordingly, the information display letter 14 is seen as a letter with a shadow. Therefore, a stereoscopic display effect, in which the information display letter 14 is seen as the information display letter 14 is raised from the outside of the vehicle, can be obtained.

According to the embodiments of the present invention, the first engaging portion of the garnish cover 10 (roof rail cover 110, side protection molding cover 210) includes the flange portion 12 (first engaging portion 112, first engaging portion 212), the second engaging portion of the garnish body 20 (roof rail body 120, side protection molding body 220, garnish body 440) includes the rib 321 and the fitting portion 21 both extending in a lengthwise direction of the garnish body 20 (roof rail body 120, side protection molding body 220, garnish body 440), the flange portion 12 (first engaging portion 112, first engaging portion 212) of the garnish cover 10 (roof rail cover 110, side protection molding cover 210) fits with the fitting portion 21 (the second engaging portion 121, the second engaging portion 221) of the garnish body 20 (roof rail body 120, side protection molding body 220, garnish body 440), and the garnish cover 10 (roof rail cover 110, side protection molding cover 210) covers the garnish body 20 (roof rail body 120, side protection molding body 220, garnish body 440).

According to the embodiments of the present invention, the pillar garnish 1 (roof rail 101, side protection molding 201, pillar garnish 402) for the door sash 2 (vehicle 102, vehicle 202, door sash 330) includes the garnish cover 10 (roof rail cover 110, side protection molding cover 210) having the decorative surface 11 (decorative surface 111, decorative surface 211) formed at the exterior portion of the garnish cover 10 (roof rail cover 110, side protection molding cover 210) and the garnish body 20 (roof rail body 120, side protection molding body 220, garnish body 440), which forms the structural portion attached to the door sash 2 (vehicle 102, vehicle 202, door sash 330). Even when the rib 321, the clip portion 342 (attaching portion to the door sash 2 (vehicle 102, vehicle 202, door sash 330) serving as the second engaging portion, which cause a sink mark made on the garnish body 20 (roof rail body 120, side protection molding body 220, garnish body 440), are provided at the garnish body 20 (roof rail body 120, side protection molding body 220, garnish body 440), the sink mark made on the garnish body 20 (roof rail body 120, side protection molding body 220, garnish body 440) is covered by the garnish cover 10 (roof rail cover 110, side protection molding cover 210). Accordingly, a design of the pillar garnish 1 (roof rail 101, side protection molding 201, pillar garnish 402) is not degraded. Further, because the garnish cover 10 (roof rail cover 110, side protection molding cover 210) includes the flange portion 12 (first engaging portion 112, first engaging portion 212) at the end of the garnish cover 10 (roof rail cover 110, side protection molding cover 210), the decorative surface 11 (decorative surface 111, decorative surface 211) can have a solid appearance. Accordingly, dimensional precision controls and adjustments between components for each product, which are required for the known door sash, are not required. Further, because the garnish cover 10 (roof rail cover 110, side protection molding cover 210), which includes the flange portion 12 (first engaging portion 112, first engaging portion 212) at the end of the garnish cover 10 (roof rail cover 110, side protection molding cover 210), has a simple shape, attaching of an exterior film, painting, printing, or the like, can be applied to the garnish cover 10 (roof rail cover 110, side protection molding cover 210). Accordingly, various designs of the garnish cover 10 (roof rail cover 110, side protection molding cover 210) are available. Further, because an appearance quality of the garnish body 20 (roof rail body 120, side protection molding body 220, garnish body 440) is not required, an optimum shape and a material (a resin containing glass fiber, a high-strength resin containing carbon fiber, a resin, which is easily degraded by ultraviolet ray, an inexpensive resin, for example, a recycled material, of which a surface quality is inferior, or the like) can be selected for retaining rigidity of the garnish body 20 (roof rail body 120, side protection molding body 220, garnish body 440) to hold the garnish cover 10 (roof rail cover 110, side protection molding cover 210) and to be attached to the door sash 2 (vehicle 102, vehicle 202, door sash 330). Further, because a position of the rib 321 at the garnish body 20 (roof rail body 120, side protection molding body 220, garnish body 440) is not restrained by the design and the structure of the garnish body 20 (roof rail body 120, side protection molding body 220, garnish body 440), degree of freedom of design of the garnish body 20 (roof rail body 120, side protection molding body 220, garnish body 440) can be enhanced.

According to the embodiments of the present invention, the garnish cover 10 (roof rail cover 110, side protection molding cover 210) is made with a plate member of a uniform thickness.

According to the embodiments of the present invention, because the garnish cover 10 (roof rail cover 110, side protection molding cover 210) including the flange portion 12 (first engaging portion 112, first engaging portion 212) at the end of the garnish cover 10 (roof rail cover 110, side protection molding cover 210) has a simple shape, the garnish cover 10 (roof rail cover 110, side protection molding cover 210) can be made with the plate member, which has the uniform thickness. The material of the plate member can be selected from various materials, for example, a metal (aluminum, stainless used steel (SUS), iron, titanium, or the like) and a resin (polypropylene (PP), polyethylene (PE), acrylic resin (AC), acrylonitrile-butadiene-styrene (ABS), polycarbonate (PC), or the like).

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An exterior component for a vehicle, comprising:
 a first member having a decorative surface provided at an external portion thereof for transmitting light, the first member further including first engaging portions at opposite lengthwise ends thereof;
 a second member having second engaging portions at opposite lengthwise ends thereof, the second member being coupled to the first member to form a double layered structure, the second member being adapted to be attached to the vehicle after forming of the double layered structure; and
 a light-emitting member provided in the double layered structure of the first member and the second member for lighting up and shutting off the light in response to a supply of electricity supplied from the vehicle, wherein
 the first engaging portions of the first member are brought into engagement with the second engaging portions of the second member such that the first member covers the second member inclusive of its opposite lengthwise ends.

2. The exterior component for the vehicle according to claim 1, wherein
 the first member includes a translucent film.

3. The exterior component for the vehicle according to claim 1, wherein
 the light-emitting member includes an organic electroluminescence.

4. The exterior component for the vehicle according to claim 1, wherein
 a resin plate for transmitting light on which an information display letter is provided is provided at a position between the first member and the light-emitting member, and the resin plate makes contact with the light-emitting member.

5. The exterior component for the vehicle according to claim 2, wherein
 a resin plate for transmitting light and on which an information display letter is provided is provided at a position between the first member and the light-emitting member, and the resin plate makes contact with the light-emitting member.

6. The exterior component for the vehicle according to claim 5, wherein
 the first member is made with a plate member of a uniform thickness.

* * * * *